United States Patent
Griffen et al.

[19]

[11] Patent Number: 5,902,066
[45] Date of Patent: May 11, 1999

[54] TAPER SHAFT LOCK

[75] Inventors: Neil C. Griffen, Westerville; Kenneth L. Dickinson, Columbus, both of Ohio

[73] Assignee: Lake Shore Cryotronics, Inc., Westerville, Ohio

[21] Appl. No.: 08/889,693

[22] Filed: Jul. 10, 1997

[51] Int. Cl.⁶ ............................................... F16B 2/18
[52] U.S. Cl. ................................. 403/374.3; 403/358
[58] Field of Search ................................... 403/355, 356, 403/357, 358, 374, 370, 374.1, 374.2, 374.3, 374.4

[56] References Cited

U.S. PATENT DOCUMENTS

| | | | |
|---|---|---|---|
| 603,692 | 5/1898 | Hoyt et al. | 403/356 X |
| 1,629,113 | 5/1927 | Maier | 403/367 |
| 1,984,454 | 12/1934 | Belyavin | 403/367 |
| 2,547,789 | 4/1951 | Skeel | 403/370 |
| 2,718,155 | 9/1955 | Firth | 403/370 X |
| 2,894,772 | 7/1959 | Hitt | 403/356 X |
| 3,574,365 | 4/1971 | Bailey et al. | 403/356 |
| 3,969,034 | 7/1976 | Gaul et al. | 403/370 X |
| 3,995,824 | 12/1976 | Bauer | 403/370 X |
| 4,411,550 | 10/1983 | Schutt et al. | 403/358 |
| 4,573,825 | 3/1986 | Muellenberg | 403/370 |
| 4,781,486 | 11/1988 | Mochizuki | 403/303 |
| 4,906,124 | 3/1990 | Hogue | 403/352 |
| 5,123,771 | 6/1992 | Okuno | 403/369 |
| 5,145,277 | 9/1992 | Fujita et al. | 403/374 |
| 5,263,802 | 11/1993 | Fichot et al. | 403/370 X |
| 5,370,472 | 12/1994 | Muellenberg | 403/370 |
| 5,442,973 | 8/1995 | Liao | 74/551.1 |
| 5,558,457 | 9/1996 | Mullenberg | 403/370 |

FOREIGN PATENT DOCUMENTS 2352751  5/1974  Germany ............................... 403/374

OTHER PUBLICATIONS

1997 Power Transmission Design, "Keyless Shaft–To–Hub Locking Devices", pp. A379–A381, 1997.
Lake Shore Cryotronics, Inc. brochure, "SLIM Tach SL56 Heavy Duty Encoder", 1996.
Whittet–Higgins Handbook of Engineering and Design—"Bearhug Self Locking Nuts" (undated).
Ringfeder Shaft–Hub Locking Devices brochure—Locking Elements, Shrink Discs And Locking Assemblies (1990).
Gerwah Prazision—"Safety couplings for high dynamic drives" (undated).
Rimtec Corporation brochure—Gerwah Zero–Backlash Servo–Quality Metal Bellows Couplings (undated).
Clamp–Tite brochure, Collars and Couplings From Holo Krome, Jan., 1991.
U.S. Tsubaki, Inc. brochure, "Power–Lock" (undated).
Bikon & Dobikon brochure, "Locking Assemblies" (undated).
Bikon brochure, "Shrink Discs (External Locking Devices)" (undated).
Zero–Max brochure, "Composite Disc Couplings" (undated).
Spieth brochure, "Adjustable Locknuts" (1995).
Trantorque brochure, "Fenner Drives" (undated).
Spieth brochure, "Clamping Sleeves" (undated).
U.S. Tsubaki Power–Lock, KE Series Power–Lock Self–Centering Keyless Locking Power (1995).

(List continued on next page.)

*Primary Examiner*—Harry C. Kim
*Attorney, Agent, or Firm*—Nixon & Vanderhye P.C.

[57] ABSTRACT

A device for locking a disk or plate to a shaft, wherein the disk or plate has an opening therein corresponding substantially to the diameter of the shaft; the device comprising:
 a) a threaded bolt having an enlarged head;
 b) a wedge piece having a round outer surface interrupted by a tapered flat surface on one side thereof; the wedge piece having a throughbore through which the bolt is passed; and
 c) a nut for threaded engagement on the threaded bolt downstream of the wedge piece, the nut being bonded to the threaded shank adjacent the wedge piece.

12 Claims, 2 Drawing Sheets

OTHER PUBLICATIONS

B–Loc Corp. brochure, "Locking Assemblies Series B800" (undated).

Climax Metal Products Company, Manufacturers of Quality Shaft Collars, Couplings & Precision Parts (undated).

LakeShore RIM Tach 8500 Digital Tachometer Instruction Manual (Apr. 24, 1996).

ically attached to the shaft either directly or with the aid of
TAPER SHAFT LOCK This invention relates to a taper or wedge type locking device designed to hold a disk, plate or drum on a shaft.

BACKGROUND

There are numerous instances in many areas of technology where it is desirable to fasten a plate, disk, drum or the like to a shaft for rotation with the shaft. There are equally numerous techniques for fastening such items to a shaft, but these techniques are not always satisfactory. In one particular application, shaft encoders marketed by the assignee of the subject invention require that a drum or disk be attached to a motor shaft. The circumference of the drums (or pulse wheels) contain magnetic patterns which are detected by a sensor in a module that is usually affixed to the motor face. The sensor output is used to determine the speed and direction of rotation of the shaft. These drums must be rigidly attached to the shaft either directly or with the aid of an adaptor plate, so that there is no relative motion between the circumference of the disk and the motor shaft. There are many schemes for accomplishing the attachment. Of those available today, many types are able to lock the drum to the shaft sufficiently, but each has drawbacks, some of which are listed below:

costly, precise machining of many parts often required;

time consuming installation due to large number of screws to tighten and other assembly steps;

problematic removal, particularly of wedge type locks; and high moments of inertia in some devices degrade performance of the device employing the shafts.

Other types of locking devices that are less costly do not lock the drum in place well enough in high slew rate applications. These include use of compression clamping devices such as split C-clamps.

For some applications where a shaft passes through a drum adaptor, set screws have been used to hold the adaptor in place. The set screws are placed on the same longitudinal point on the axis, but separated by 90° about the axis. In this position, each screw pushes the shaft directly against the other side of the adaptor. Because they are transversely located, however, they do not counteract or interfere with each other. Many times a customer will pre-drill holes in the shaft for receiving the set screws that lock the drum in place. In both cases, with and without the pre-drilled holes, the set screws will displace metal when the adaptor rotates relative to the shaft. In fact, there have been numerous field reports of problems with the set screw design, and the complaints include:

Set screws often do not prevent slippage of the adapters in high slew rate applications;

The results are not consistent;

The shafts are deformed when the set screws are tightened. This often makes the adapter difficult to remove. They are often either forcibly pulled off, heated with a torch or simply pounded off with a hammer. This further scores the surface of the shaft which must be smoothed before it can be used again;

Pre-drilled holes are often necessary to get good performance. This is an expensive procedure as the holes must be located accurately.

When the adapter moves with respect to the shaft, the surface of the shaft is further deformed. A valley or gouged out area is left behind the set screws. When the shaft reverses direction, it is far easier for the shaft to follow the valley back to the original position. In high slew rate applications, the valleys get deeper and longer as the directions continue to change. This continuous movement of the adapter is unacceptable.

In some applications, the set screws are small allowing either the set screw threading is stripped or the internal socket structure of the screw is damaged. This prevents further tightening or removing of the screw.

There have been many other approaches to firmly attach a disk, drum or plate to a shaft. One of the most common is to use a keyway. For many reasons, however, this is not always appropriate for various applications.

Another approach which produces an excellent grip is often generally referred to as the Ringfedder® type. Here, a wire is wrapped around the shaft and two disks with a taper on the inner diameter are placed on either side. Bolts are used to clamp the two disks together and, as the tapered internal diameters press against the wire, they are forced against the shaft and the disks. This creates a uniform pressure about the circumference. Although these disks work well, they are too expensive to use. In addition, assembly requires the tightening of many screws which is undesirably time consuming.

Another technique is to use taper bushings which work well but are also expensive. Moreover, removing them is often not an easy task and jacking screws are usually required.

In still another technique, C-shaped rings are placed around the shaft and fingers added to the disk are clamped between the C-clamp and the shaft. Screws are added between the open faces of the C-shaped ring so that when tightened, the clamp traps the fingers and holds the disk to the shaft.

Other methods, such as heat shrinking, are not practical where disks or drums are to be secured to a shaft.

SUMMARY OF THE INVENTION

In accordance with the present invention, a simple and easy to use device is employed for the purpose of securing a disk, drum or plate to a shaft and, more particularly, to secure a drum adaptor plate to a motor shaft.

In the exemplary embodiment of the invention, a taper shaft lock device is provided which includes a threaded bolt, a wedge piece, a washer and a nut to be utilized in conjunction with a recess and cooperating, inclined threaded bore adjacent the center hole of a drum adaptor plate or disk to be secured to a motor shaft. The wedge piece comprises essentially a cylindrical bushing with a centrally located throughbore and adjacent counterbore to receive the threaded bolt. One side of the bushing is machined to form a flat tapered surface, tapering inwardly in the direction of bolt insertion. The wedge piece is adapted to fit within a tapered recess within the adaptor plate to be secured to the shaft, with the wedge piece oriented so that the flat tapered surface lies horizontally on the shaft, thus canting the wedge piece at an angle to the shaft axis. As the threaded end of the bolt is threaded into the inclined bore within the disk plate or adaptor, the wedge piece is drawn axially into the recess, thereby exerting radial forces between the adaptor plate and the shaft. In accordance with this invention, a washer and nut are secured to the end of the shaft after it is inserted into the wedge piece but before it is threaded into engagement with the bore in the adaptor. More specifically, after the threaded bolt is inserted into the wedge piece, the washer is slipped over the threaded end of the bolt shank and into approximate abutting engagement with the wedge piece, the threads of the bolt adjacent the washer are coated with a thread lock adhesive. The nut is then threaded onto the bolt shaft and into finger-tight engagement with the washer and wedge piece in the coated area. The unit is then placed in an oven where the thread lock adhesive is cured, thereby bonding the nut to the bolt.

In use, and as explained in greater detail herein, the nut is situated within the remaining space in the adaptor plate recess, between the wedge piece and the threaded bore. With this arrangement, it will be appreciated that in order to remove the wedge piece, the threaded bolt is simply unscrewed, using an allen or similar wrench in cooperation with the hex socket in the bolt head, and as the bolt is withdrawn, the nut will back the wedge piece out of the recess.

In an alternative embodiment of the invention, the threaded rod and nut is replaced with a threaded rod with one end threaded clockwise and the other threaded counterclockwise. The throughbore in the wedge is a tapped hole. One end of the threaded rod passes through the threaded hole in the wedge shaped piece. The other end passes through the threaded section in the adapter. In this configuration, as the rod is rotated in one direction, the wedge is pulled into the adapter. When rotated in the opposite direction, the wedge is pushed out.

The above described taper shaft lock has the following advantages:

Simple installation, just slide into place and tighten the screw;

Simple removal, just back out the wedge piece;

No shaft indentations or scoring;

No pre-drilling or special shaft preparations;

Very strong attachment;

When a tightened adaptor is moved, there is no deformation of the shaft surface, and the gripping power remains high;

Can use multiple wedges in a single application where extra gripping power is needed;

The adaptor plate does not move when the wedge piece is tightened. This makes alignment easier and installers do not have to determine how far it will move before adaptor is attached firmly;

The taper shaft lock tightens from the front and not the side. Many applications have restrictions that make it difficult to access the side of the plate or disk.

Uses simple tools, i.e., a hex wrench for a standard socket head screw.

Accordingly, in its broader aspects, the present invention relates to a device for locking a disk or plate to a shaft, wherein the disk or plate has an opening therein corresponding substantially to the diameter of the shaft; the device comprising, a) a wedge shaped piece with a throughbore;

b) a threaded bolt with a first enlarged head passing through the wedge shaped piece; and c) a radially enlarged collar secured to the threaded bolt downstream from the wedge piece.

In another aspect, the invention relates to a device for locking a component to a shaft, wherein the component has an opening therein sized to receive the shaft; the device comprising:

a) a rod at least partially threaded at one end;

b) a wedge having a throughbore through which the rod is passed; and c) a collar on the rod downstream of the wedge piece, the collar fixed to the rod.

In still another aspect, the invention relates to a device for locking a disk or plate to a shaft, wherein the disk or plate has an opening therein corresponding substantially to the diameter of the shaft; the device comprising:

a) a threaded bolt having an enlarged head;

b) a wedge piece having a round outer surface interrupted by a tapered flat surface on one side thereof; the wedge piece having a throughbore through which the bolt is passed; and c) a nut threadably engaged on the threaded bolt downstream of the wedge piece, the nut being bonded to the threaded shank.

In still another aspect, the invention relates to a device for locking a component to a shaft, wherein the component has an opening therein sized to receive the shaft, the device comprising a) a rod threaded in one direction on one end and threaded in the opposite direction on the other end; and b) a wedge having a throughbore through which the rod is passed.

In still another aspect, the invention relates to a disk and disk lock assembly comprising a disk having an axially aligned center bore adapted to receive a shaft therethrough, the disk having a tapered recess extending partially through the disk and a threaded through bore extending from the recess through the disk, the recess opening to the center bore; and a disk locking device comprising a) a threaded bolt having an enlarged head; b) a wedge piece having a cylindrical outer surface interrupted by a tapered flat surface on one side thereof; the wedge piece having a smooth throughbore through which the bolt is passed; c) a nut threadably engaged on the threaded bolt downstream of the wedge piece, the nut being bonded to the threaded shank; wherein the wedge piece and nut are located within the recess, with the flat surface oriented for engagement with the shaft, and with the threaded bolt threadably engaged within the threaded throughbore in the disk.

Other objects and advantages of the subject invention will become apparent from the detailed description which follows.

DETAILED DESCRIPTION OF THE DRAWINGS

Figure 1:
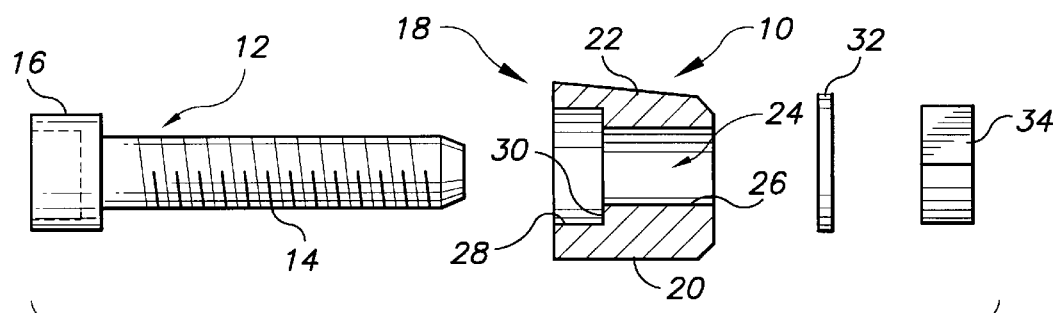
FIG. 1 is an exploded side view of the taper shaft lock assembly in accordance with the invention.
Figure 2:
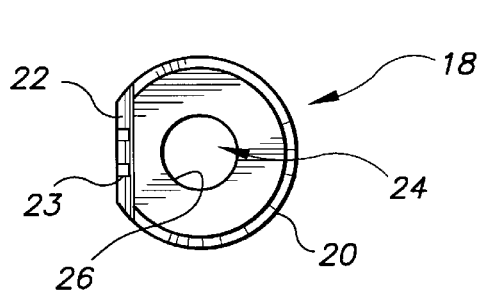
FIG. 2 is a front elevation of the wedge piece utilized in the assembly shown m FIG. 1 rotated 90° to the left.
Figure 3:
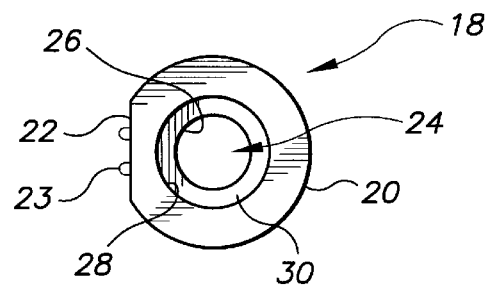
FIG. 3 is a rear elevation of the wedge piece utilized in the assembly shown in FIG. 1 rotated 90° to the left.

With reference to FIG. 1, an exploded side view of the taper shaft lock in accordance with this invention is shown generally at 10. The assembly includes a bolt or rod 12 having a threaded shank 14 and an enlarged head 16. A wedge piece 18 is essentially a cylindrical bushing with an arcuate surface 20 and a flat tapered surface 22 machined therein, with the taper extending inwardly in an axial direction. The wedge piece includes an internal throughbore 24 which includes a smaller diameter portion 26 and a larger diameter entry portion 28, bore 26 connected to bore 28 by a radial flange or shoulder 30. It will be appreciated that the bore 24 is concentric with the outer diameter of the wedge piece, but because of the flat, machined taper 22, the side view illustrated in FIG. 1 makes it appear as though the bore were eccentric relative to the axis of the wedge piece. Reference to FIGS. 2 and 3, however, illustrates or confirms that the throughbore is in fact concentric with the longitudinal axis of the wedge piece. It will also be appreciated that the configuration of the bolt 12 (or other suitable fastener) and wedge piece 18 may vary and still remain within the scope of the invention.

With the wedge piece oriented as shown in FIG. 1, the angle of the surface 22 relative to a center axis passing through the center of the wedge piece bore (and parallel to the axis of the shaft to which the disk or plate is to be secured) may be from 1° to about 7°.

A washer 32 and a threaded nut 34 complete the components of the taper shaft lock.

Figure 4:
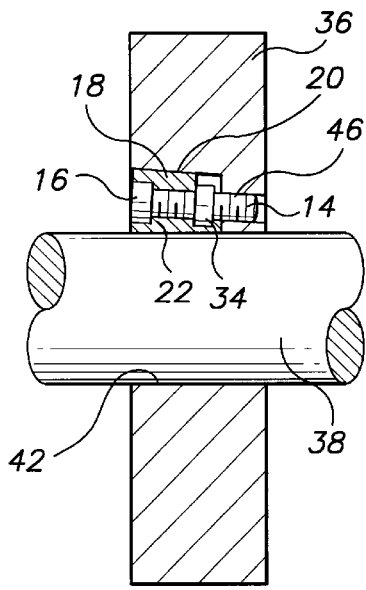
FIG. 4 is a side section illustrating a disk or plate on a shaft, with the taper lock of this invention tightened in place.

FIG. 4 illustrates the taper shaft lock with the components assembled and in operative engagement between an adaptor plate 36 and a shaft 38. Initially, however, the assembly of the taper shaft lock components will be discussed. To properly assemble the taper shaft lock, the bolt 12 is inserted into the wedge piece 18. Note that the throughbore portion 26 is smooth. It should also be noted here that the head 16 of the bolt 12 is preferably of the hex head type, i.e., the head 16 is formed with a conventional hex socket, shown in phantom in FIG. 1. After the bolt 12 is inserted into the wedge piece 18, the washer 32 is engaged over the threaded shank 14 of the bolt 12, with the washer pushed rearwardly until it engages flush with the bottom of the wedge piece. A conventional thread locker composition is then applied to the threads of the shank 14, in an area adjacent the washer 32, on the side of the washer remote from head 16. The nut 34 is then threaded onto the shank 14 and turned until only a slight clearance (about 1/32 inch) remains between the nut and the washer. The device is then placed in an oven where the thread locker composition is cured, thereby locking the nut 34 on the shank 14. Once cured, the device is removed from the oven and is ready for use. Those skilled in the art will understand that the invention is not limited to the nut 34 bonded to the shank 14. A washer or collar welded onto the shank, or an integral radial flange or collar, or other suitable means may be employed.

Figure 5:
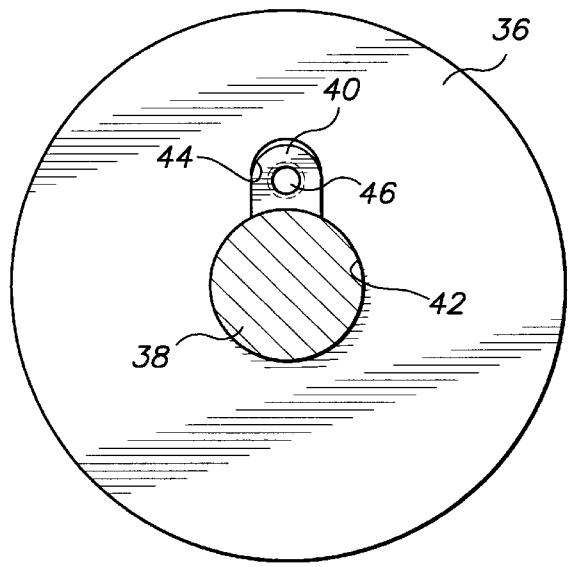
FIG. 5 is an end view of the arrangement illustrated in FIG. 4, but with the taper shaft lock of this invention removed.
Figure 6:
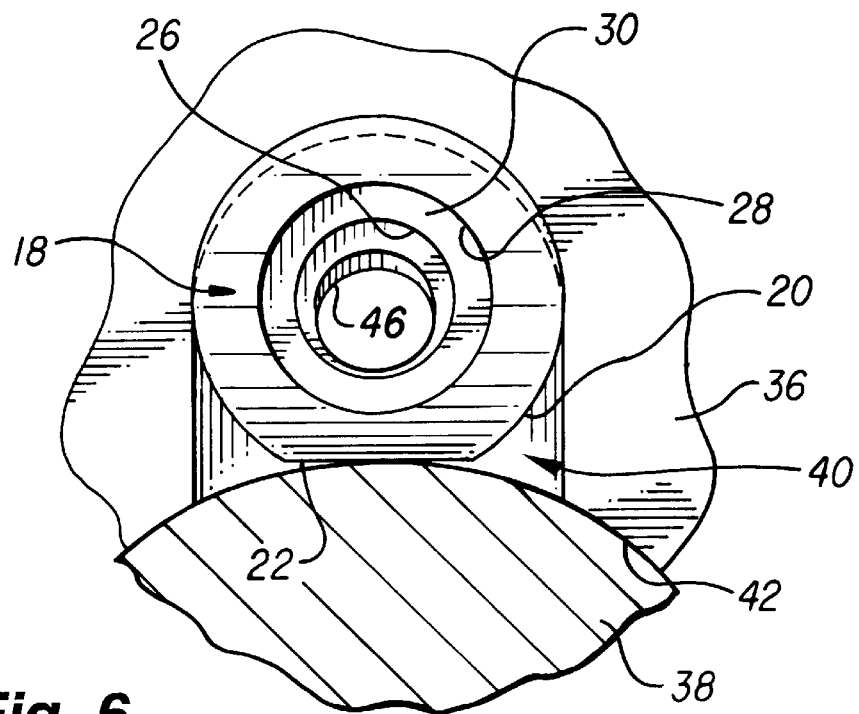
FIG. 6 is an enlarged detail taken from FIG. 5, but with the wedge piece (but not the bolt) in place.

With reference now to FIGS. 5 and 6 as well as FIG. 4, the manner in which the taper shaft lock is utilized to secure a disk or drum adaptor plate 36 to a shaft 38 will be described. The plate 36 is formed with a tapered recess 40 which lies along, and opens to, an annular opening or bore 42 formed in the disk or plate and through which the shaft 38 extends. The recess 40 is tapered axially along its radial outermost surface 44 so as to receive the wedge piece 18 in an axial sliding relationship, with the arcuate surface 20 engaged with the arcuate surface 44 of the recess. Note that the taper angle of surface 44 is substantially identical to the taper angle of surface 22, i.e., between 1° and 7°. Axially adjacent the recess 40, the plate 36 is formed with an inclined threaded bore 46 adapted to threadably receive the threaded shank 14 of the bolt 12. The threaded bore 46 lies at the same taper angle, relative to the shaft axis, as the surface 44 of the recess.

The locking device 10 may initially be secured loosely to the disk or adaptor plate 36 by partially threading the bolt 12 into the bore 44, with the arcuate surface. To secure the plate 36 to the shaft 38, flat surface 22 of the wedge piece is aligned with the inner diameter of the plate which defines the opening or bore 42. The adaptor with the locking device is then pushed onto the shaft 38 with the flat surface 22 riding along the shaft 38 (in substantially "line" contact) while the curved portion of the wedge piece engages the arcuate taper of the wedge piece. The plate is then slidably received over the shaft 38 to the desired axial location on the shaft. The hex head socket screw 12 is then tightened within the wedge piece. During this tightening procedure, the wedge piece 18 moves axially within the recess 40 until the wedge is tight, usually as tight as possible without exceeding the torque limits of the screw. During this tightening procedure, however, the plate 36 does not move axially on the shaft 38. Note that by placing the flat surface 22 on the shaft, the entire wedge piece 18 is now inclined, so that the surface opposite the surface 22 engages the tapered recess surface, and the bolt 12 is now also inclined at the same 1–7° taper angle.

In order to remove the disk or plate 36 from the shaft 38, the hex head socket screw 12 is turned in a counterclockwise direction to back the screw out of the threaded bore 46. At the same time, since the threaded nut 34 is bonded to the shank 14, as the screw 12 is backed out of the threaded bore 46, the nut 34 pushes the wedge piece 18 out of the recess 40. Once the taper shaft lock 10 is loosened or removed, the disk or plate 36 is able to slide off the shaft 38.

Figure 7:
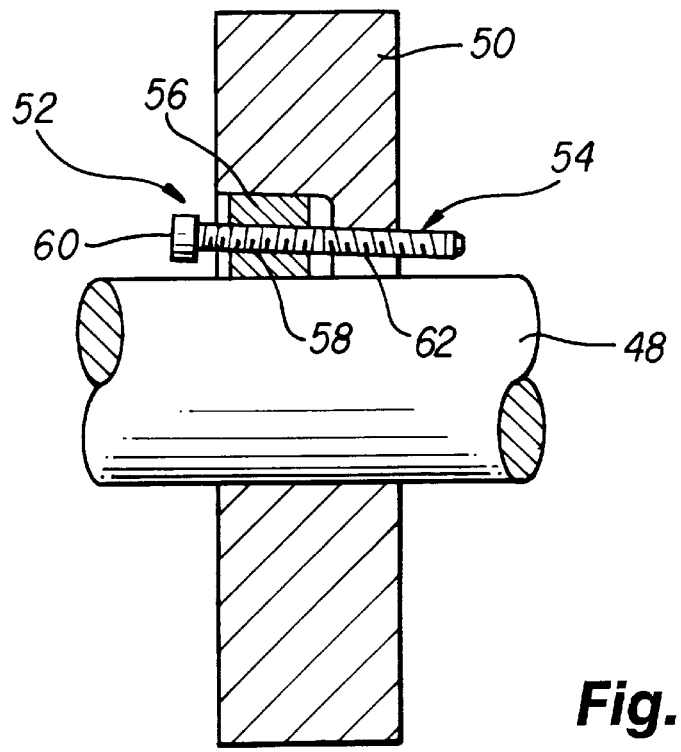
FIG. 7 is a side section similar to FIG. 4 but illustrating another embodiment of the invention.

Turning to FIG. 7, an alternative embodiment of the invention is illustrated. The overall arrangement of the shaft 48, plate or disk 50 and wedge lock device 52 is similar to that described above. In this embodiment, however, the nut 34 has been eliminated in favor of a double reverse threaded arrangement on the bolt 54. More specifically, the wedge piece 56 is threaded onto the bolt 54 utilizing threads 58, and the free end of the bolt (i.e., the end remote from the head 60) is then threaded into the plate 50 by means of threads 62 which are of a reverse hand relative to the threads 58. With this arrangement, as the bolt 54 is rotated in one direction, the wedge piece 56 is pulled into the adapter plate 50. When rotated in the opposite direction, however, the wedge piece 56 is pushed out of the plate adapter.

It should be understood further that the invention is equally applicable for use with shafts other than round shafts, e.g., square shafts.

It has also been discovered that changing the surface of the wedge where it contacts the shaft will affect the performance. Variations in hardness will change the holding power of the device. Generally, the harder the wedge, the better the grip. Further, striations on the surface of the wedge parallel to the sliding direction dramatically increases the holding power. These striations (two shown at 23 in FIGS. 2 and 3) deform the surface of the shaft into grooves perpendicular to the rotation of the adapter. Unlike set screws which have point deformations, these deformations can extend the length of the wedge. The amount of material that would have to be moved to rotate the adapter is significant. The moving of material can increase the holding power by a factor of two or more. Other variations in the surface of the wedge will also affect the holding power of the device.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A device for locking a disk or plate to a shaft, wherein the disk or plate has an opening therein corresponding substantially to the diameter of the shaft; the device consisting of:
   a) a bolt having an enlarged head and a threaded shank;
   b) a wedge piece having a round outer surface interrupted by a tapered flat surface on one side thereof; the wedge piece having an unthreaded throughbore through which the threaded shank of the bolt is passed;
   c) a washer located on said threaded shank in engagement with a downstream side of the wedge piece; and
   d) a nut threadably engaged and bonded to the threaded shank adjacent said washer, and with a remote end of the threaded shank of the bolt adapted for threaded engagement with the disk or plate.

2. A device for locking a component to a shaft, wherein the component has an opening therein sized to receive the shaft; the device comprising:
   a) a rod having an enlarged head and a shank, the shank having a first portion proximate to said head which is threaded in one direction and a second portion remote from said head which is threaded in an opposite direction; and
   b) a wedge having a threaded bore, with said wedge threadably engaged with said first portion of said shank.

3. A disk and disk lock assembly comprising:
   a disk having an axially aligned center bore adapted to receive a shaft therethrough, said disk having a tapered recess or slot extending partially through said disk and a threaded through bore extending from said recess through said disk, said recess opening to said center bore; and
   a disk locking device comprising:
   a) a bolt having an enlarged head and a threaded shank;
   b) a wedge piece having a cylindrical outer surface interrupted by a tapered flat surface on one side thereof; the wedge piece having a smooth throughbore through which the bolt is passed;
   c) a nut threaded engaged on the threaded bolt downstream of the wedge piece, the nut being bonded to the threaded shank;
   wherein the wedge piece and nut are located within said recess, with said flat surface oriented for engagement with said shaft, and with said threaded bolt threadably engaged within said threaded through bore in said disk, and further wherein one radially outer surface of said recess and said threaded through bore extend at an angle of from 1° to about 7° relative to a longitudinal axis of said smooth through bore.

4. The assembly of claim 3 wherein the nut is bonded to the threaded shank by a heat activated thread locking composition.

5. The device of claim 4 wherein a washer is located between the wedge piece and the nut.

6. The device of claim 3 wherein the threaded bolt is formed with a head having a hex socket.

7. The device of claim 3 wherein said flat surface is formed with at least one striation extending substantially parallel to said shaft.

8. A disk and disk lock assembly comprising:
   a disk having an axially aligned center bore adapted to receive a shaft therethrough, said disk having a tapered recess or slot extending partially through said disk and a threaded through bore extending from said recess through said disk, said recess opening to said center bore; and
   a disk locking device comprising:
   a) a bolt having an enlarged head and a threaded shank;
   b) a wedge piece having a cylindrical outer surface interrupted by a tapered flat surface on one side thereof; the wedge piece having a smooth throughbore through which the bolt is passed;
   c) a nut threaded engaged on the threaded bolt downstream of the wedge piece, the nut being bonded to the threaded shank;
   wherein the wedge piece and nut are located within said recess, with said flat surface oriented for engagement with said shaft, and with said threaded bolt threadably engaged within said threaded through bore in said disk; and wherein said tapered flat surface is inclined at an angle of from 1° to about 7° relative to a longitudinal axis of said smooth through bore.

9. The assembly of claim 8 wherein said shaft has a round peripheral surface engaged, in use by said flat surface of said wedge piece.

10. A device for locking a component to a shaft wherein the component has an opening therein sized to receive the shaft, the device comprising:
    a) a bolt having an enlarged head and a threaded shank;
    b) a wedge through which the threaded shank of the bolt is passed, said wedge having a round outer surface interrupted by a tapered flat surface on one side thereof inclined at an angle of from 1° to 7° relative to a longitudinal center axis through said wedge; and
    c) a nut fixed to the threaded shank of the bolt by a heat activated thread locking composition;
    and wherein the wedge includes an unthreaded throughbore, and further wherein a relatively larger counterbore is provided at one end of the wedge for receiving the head of the bolt.

11. The device of claim 10 wherein a washer is located between the wedge and the nut.

12. The device of claim 10 wherein the head of the bolt is formed with a hex socket.

* * * * *